(12) United States Patent
Uzhegov (10) Patent No.: US 11,978,589 B2
(45) Date of Patent: May 7, 2024

(54) MAGNETIC ACTUATOR FOR A MAGNETIC SUSPENSION SYSTEM

(71) Applicant: SPINDRIVE OY, Lappeenranta (FI)

(72) Inventor: Nikita Uzhegov, Lappeenranta (FI)

(73) Assignee: SPINDRIVE OY, Lappeenranta (FI)

(*) Notice: Subject to any disclaimer, the term of this patent is extended or adjusted under 35 U.S.C. 154(b) by 227 days.

(21) Appl. No.: 17/764,721

(22) PCT Filed: Apr. 29, 2020

(86) PCT No.: PCT/FI2020/050277
§ 371 (c)(1),
(2) Date: Mar. 29, 2022

(87) PCT Pub. No.: WO2021/064278
PCT Pub. Date: Apr. 8, 2021

(65) Prior Publication Data
US 2022/0336133 A1    Oct. 20, 2022

(30) Foreign Application Priority Data
Oct. 3, 2019   (FI) ..................................... 20195840

(51) Int. Cl.
*H01F 7/20*   (2006.01)
(52) U.S. Cl.
CPC ....... *H01F 7/206* (2013.01); *H01F 2007/208* (2013.01)
(58) Field of Classification Search
CPC .............. H01F 7/206; H01F 2007/208; F16C 32/0446; F16C 32/0465; F16C 32/0491;
(Continued)

(56) References Cited

U.S. PATENT DOCUMENTS

| 2012/0299422 A1* | 11/2012 | Filatov | ..................... H02K 7/09 310/90.5 |
| 2015/0054389 A1 | 2/2015 | Filatov et al. | |

FOREIGN PATENT DOCUMENTS

| CN | 101832335 A * | 9/2010 |
| CN | 107131211 | 10/2018 |

(Continued)

OTHER PUBLICATIONS

International Search Report for PCT/FI2020/050277, dated Aug. 25, 2020, 3 pages.
(Continued)

*Primary Examiner* — Mohamad A Musleh
(74) *Attorney, Agent, or Firm* — NIXON & VANDERHYE (57) ABSTRACT

A magnetic actuator for a magnetic suspension system includes a core section having an annular yoke and radially directed teeth joining the yoke. The magnetic actuator includes coils surrounding the teeth and a mechanical structure having a first section and a second section. The first section is attached to the yoke and conducts magnetic flux axially. The second section joins the first section and conducts the magnetic flux radially in a direction opposite to a direction of the magnetic flux in the teeth. The magnetic actuator includes a mechanical safety bearing that is between the second section and the teeth. Thus, the safety bearing is in a room surrounded by a magnetic flux circulation path. Therefore, the safety bearing does not increase an axial length of the magnetic suspension system.

20 Claims, 6 Drawing Sheets

(58) Field of Classification Search
CPC .............. F16C 2380/26; F16C 32/0461; F16C 32/048; F16C 39/02; F16C 32/0442; F16C 32/0493; F16C 25/045; F16C 32/04; F16C 32/0406; F16C 32/044; H02K 7/09
See application file for complete search history.

(56) References Cited

FOREIGN PATENT DOCUMENTS

| | | |
|---|---|---|
| CN | 209262072 | 8/2019 |
| FR | 2785734 | 5/2000 |

OTHER PUBLICATIONS

Written Opinion of the ISA for PCT/FI2020/050277, dated Aug. 25, 2020, 5 pages.
Search Report for FI20195840 dated Apr. 20, 2020 1 page.

* cited by examiner

MAGNETIC ACTUATOR FOR A MAGNETIC SUSPENSION SYSTEM

This application is the U.S. national phase of International Application No. PCT/FI2020/050277 filed Apr. 29, 2020 which designated the U.S. and claims priority to FI Patent Application No. 20195840 filed Oct. 3, 2019, the entire contents of each of which are hereby incorporated by reference.

FIELD OF THE DISCLOSURE

The disclosure relates to a magnetic actuator for a magnetic suspension system that can be, for example but not necessarily, an active magnetic bearing "AMB". Furthermore, the disclosure relates to a magnetic suspension system.

BACKGROUND

Magnetic suspension systems such as e.g. active magnetic bearings "AMB" are commonly used for levitating e.g. rotating or oscillating objects. A typical application is levitation of a rotor of an electrical machine, e.g. a high-speed electrical machine. In many cases, the levitation is accomplished by balancing attractive forces of oppositely acting magnets and other forces acting on an object to be levitated, where at least one of the magnets is a controllable electromagnet. In principle, it is also possible to balance an attractive force of one controllable electromagnet with other forces, e.g. the gravity force, acting against the attractive force of the electromagnet. There are several different kinds of magnetic suspension systems. Some systems use permanent magnet material to generate bias magnetic fluxes, while others use direct biasing currents to generate the bias magnetic fluxes. The biasing is used to linearize the operation of the system and to improve control dynamics of the system. Furthermore, the biasing based on permanent magnet material reduces energy consumption of a magnetic suspension system.

Magnetic forces acting in all or some degrees of freedom of a levitated object, e.g. a rotor of an electrical machine, need to be controlled actively because of inherent instability of the magnetic levitation. The instability is caused by the fact that a magnetic attractive force acting between a magnet and an object made of e.g. ferromagnetic material increases when an airgap between the magnet and the object gets smaller.

In case of a control system failure and/or absence of energy and/or excessive external disturbance, an object levitated by a magnetic suspension system is shifted from a desired position of the object. To prevent damages of the object and/or stationary parts of the magnetic suspension system, the magnetic suspension system is typically equipped with safety means for carrying the object when the magnetic levitation is non-operating or when the capacity of the magnetic levitation is exceeded. In cases where the magnetic suspension system is an active magnetic bearing "AMB" for levitating a rotor, the above-mentioned safety means comprise typically one or more mechanical safety bearings that can be e.g. rolling bearings or sliding bearings. The mechanical safety bearings are typically successively with magnetic actuators of the active magnetic bearings in the axial direction of the rotor. This increases the overall axial length of the rotor, thereby adding extra material causing additional mass. A drawback of the increase of the axial length is a need for oversizing the magnetic actuators to suspend also the additional mass. Another drawback of the increase of the axial length is the decrease in the natural frequencies of the rotor, which narrows the usable range of rotational speed of the rotor.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new magnetic actuator for a magnetic suspension system that can be, for example but not necessarily, an active magnetic bearing "AMB".

A magnetic actuator according to the invention comprises:
- a core section having an annular yoke and radially directed teeth joining the annular yoke,
- coils having radially directed magnetic axes and surrounding the radially directed teeth,
- a mechanical structure having a first section attached to the annular yoke and extending axially from the annular yoke and a second section joining the first section and extending radially from the first section in a same direction in which the radially directed teeth extend radially from the annular yoke, and
- a mechanical safety bearing that is, in the axial direction of the magnetic actuator, between the second section of the mechanical structure and the radially directed teeth of the core section.

The above-mentioned first section of the mechanical structure is suitable for conducting magnetic flux axially and the second section is suitable for conducting the magnetic flux radially in a direction opposite to a direction of the magnetic flux in the radially directed teeth. Thus, a room surrounded by a magnetic flux circulation path is utilized for the mechanical safety bearing. Therefore, the mechanical safety bearing does not increase the overall axial length of a magnetic suspension system that comprises the magnetic actuator. Furthermore, a magnetic actuator according to an advantageous and exemplifying embodiment can be assembled separately from other parts of a magnetic suspension system, and thereafter the magnetic actuator that has the integrated mechanical safety bearing can be installed as a single component on the magnetic suspension system.

In a magnetic actuator according to an advantageous and exemplifying embodiment, the above-mentioned first section of the mechanical structure comprises a permanent magnet having an axial direction of magnetization. The permanent magnet generates a bias magnetic flux that linearizes the operation of the magnetic actuator with respect to changes in electric currents of the coils and in a position of an object being levitated. Furthermore, the biasing improves control dynamics of the magnetic actuator and reduces energy consumption of the magnetic actuator.

In accordance with the invention, there is provided also a new magnetic suspension system that comprises:
- at least one magnetic actuator according to the invention for magnetically levitating an object,
- equipment for generating a position signal indicative of a position of the object with respect to a reference position of the object, and
- a controller for controlling electric currents of the coils of the magnetic actuator based on the position signal.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
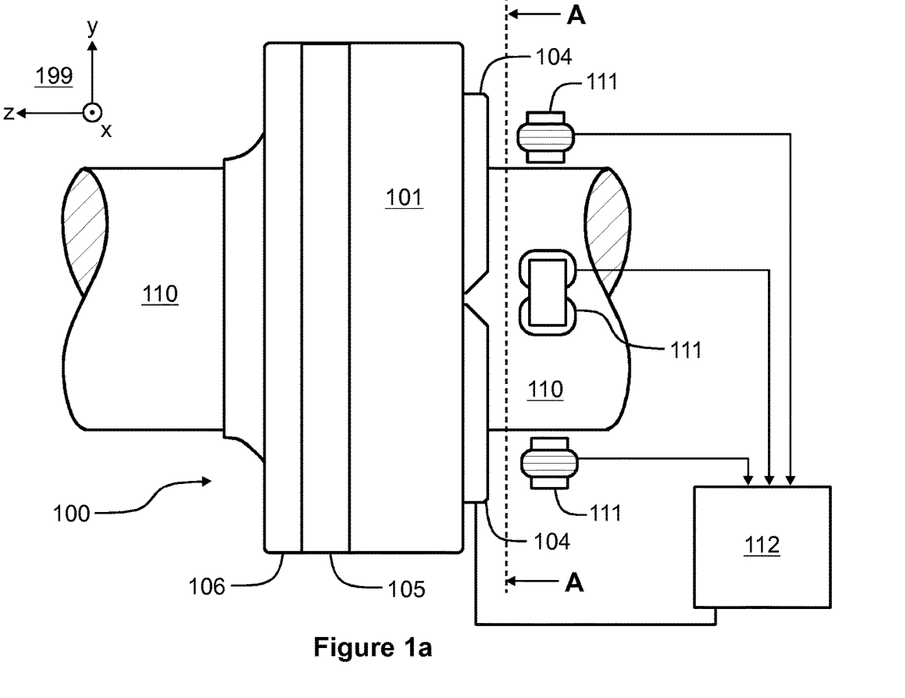
FIGS. 1a, 1b, 1c, and 1d illustrate a magnetic suspension system that comprises a magnetic actuator according to an exemplifying and non-limiting embodiment.
Figure 1B:
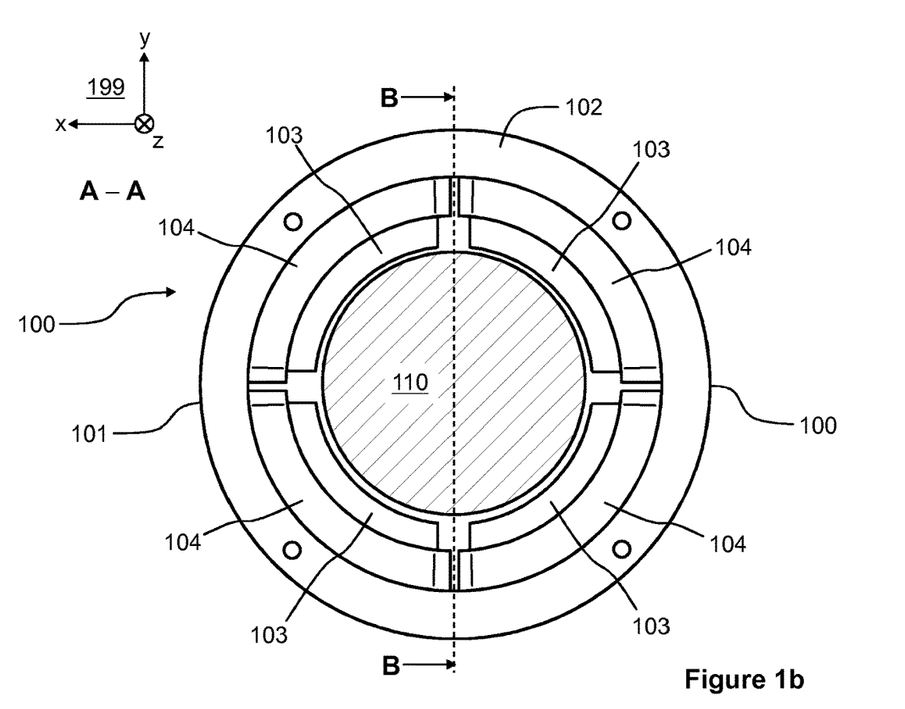
Figure 1C:
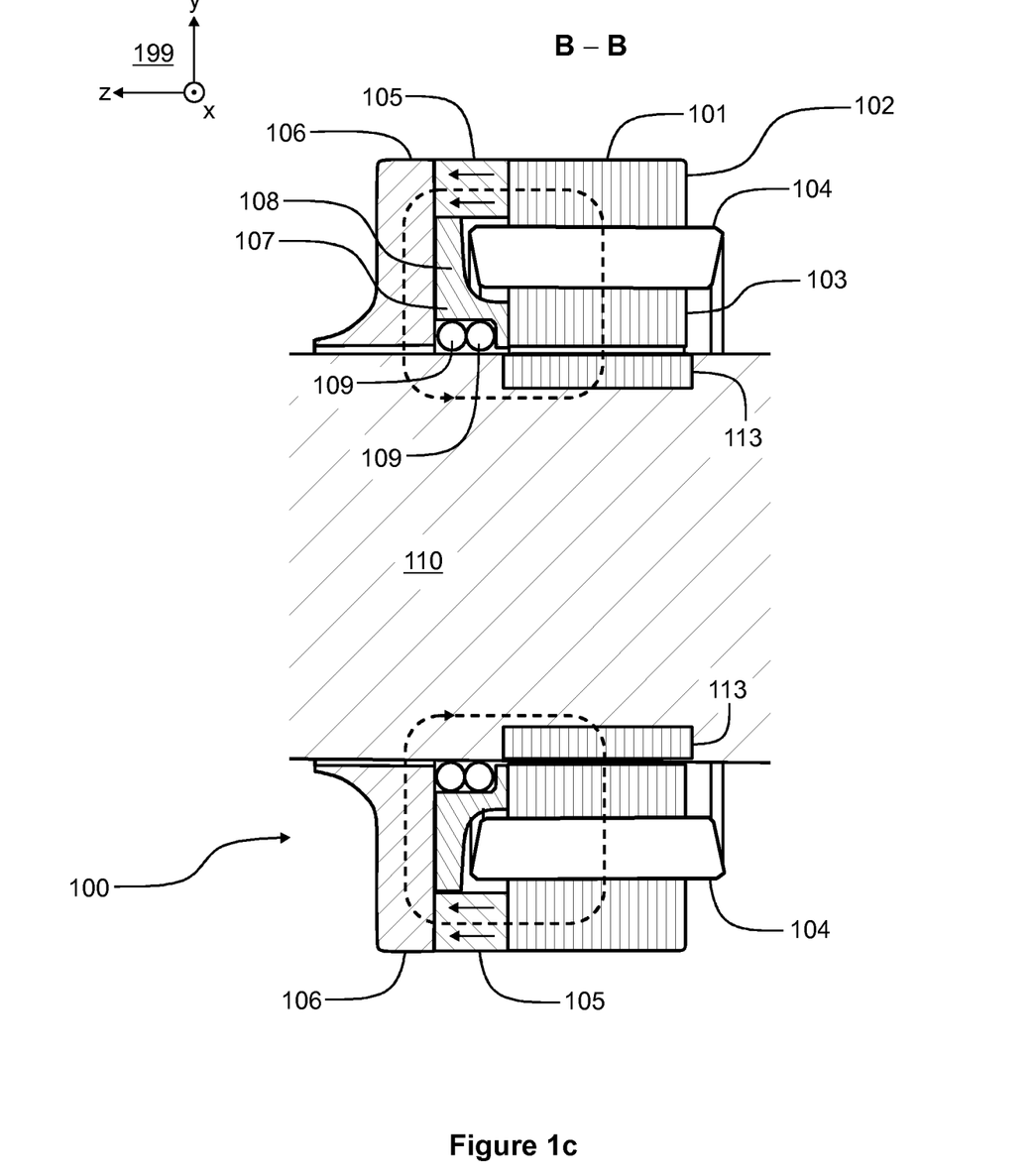
Figure 1D:
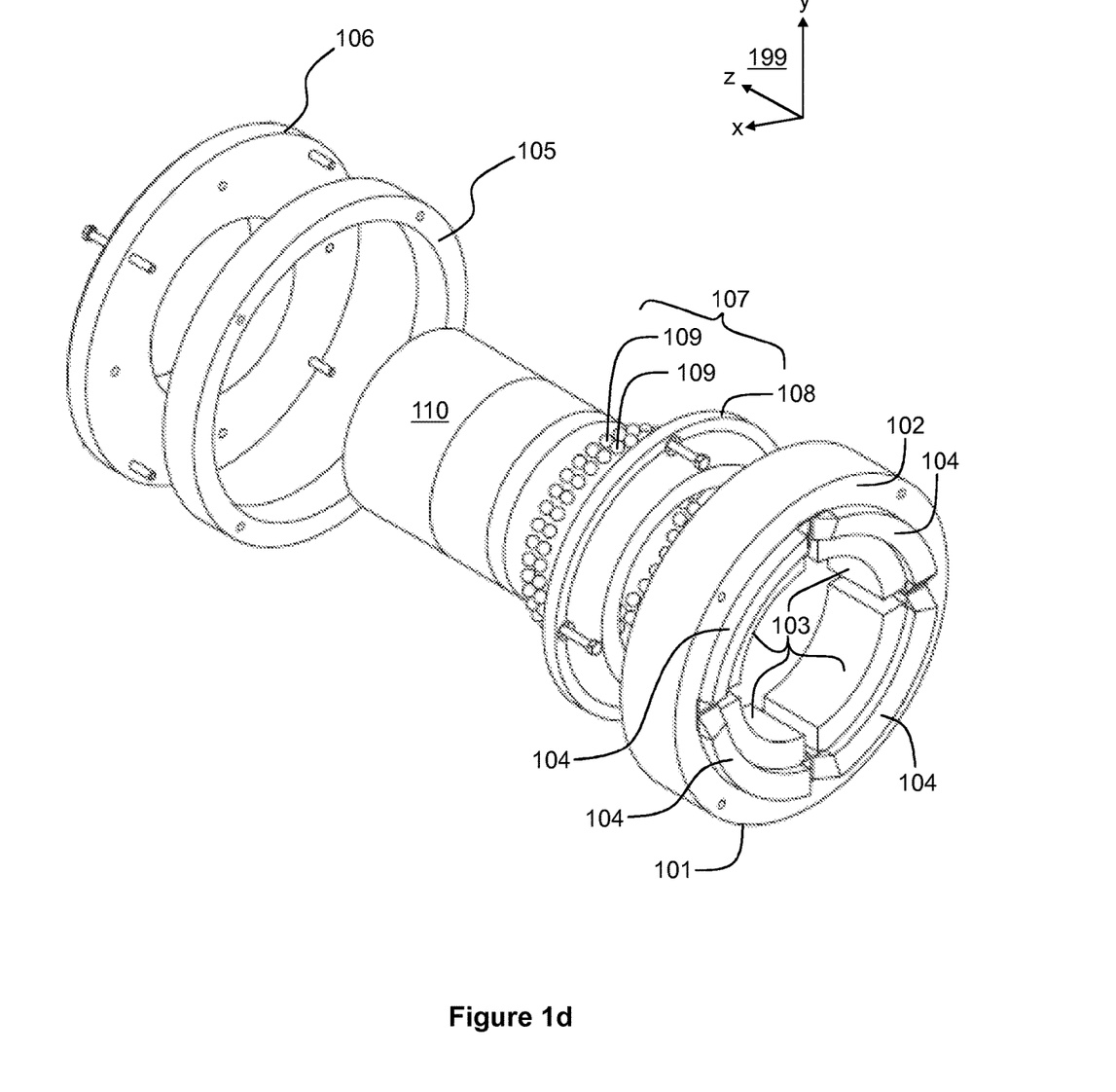

FIG. 1a shows a sideview of a magnetic suspension system that comprises a magnetic actuator 100 according to an exemplifying and non-limiting embodiment. The magnetic actuator 100, together with possible other magnetic actuators, levitates an object 110 that can be e.g. a rotor of an electrical machine. The possible other magnetic actuators are not shown in FIG. 1a. FIG. 1b shows a view of a section taken along a line A-A shown in FIG. 1a, and FIG. 1c shows a view of a section taken along a line B-B shown in FIG. 1b. The geometric section plane related to FIG. 1b is parallel with the xy-plane of a coordinate system 199, and the geometric section plane related to FIG. 1c is parallel with the yz-plane of the coordinate system 199. FIG. 1d shows an exploded view of the magnetic actuator. In the exemplifying case illustrated in FIGS. 1a-1d, the magnetic suspension system is a radial magnetic bearing for supporting the object 110 in radial directions perpendicular to the axis of rotational symmetry of the object 110. The axis of rotational symmetry is parallel with the z-axis of the coordinate system 199.

The magnetic actuator 100 comprises a core section 101 having an annular yoke 102 and radially directed teeth 103 joining the annular yoke. The core section 101 comprises material whose relative magnetic permeability is greater than one, $\mu_r > 1$. Advantageously, the core section 101 comprises ferromagnetic material. In the exemplifying magnetic actuator 100 illustrated in FIGS. 1a-1d, the end-surfaces of the radially directed teeth 103 are congruent with a geometric circular cylinder surface to provide smooth airgaps with the rotationally symmetric object 110. The magnetic actuator 100 comprises coils 104 having radially directed magnetic axes and surrounding the radially directed teeth 103. The magnetic actuator 100 comprises a mechanical structure that has a first section 105 and a second section 106. The first section 105 is attached to the annular yoke 102 and extends axially from the annular yoke. The second section 106 is attached to the first section 105 and extends radially from the first section 105 in a same direction in which the radially directed teeth 103 extend radially from the annular yoke 102. The magnetic actuator 100 comprises a mechanical safety bearing 107 that is, in the axial direction of the magnetic actuator, between the second section 106 of the mechanical structure and the radially directed teeth 103 of the core section 101. The first section 105 of the mechanical structure is suitable for conducting magnetic flux axially, and the second section 106 is suitable for conducting the magnetic flux radially in a direction opposite to a direction of the magnetic flux in the radially directed teeth 103. The above-mentioned is valid for each flux line. In FIG. 1c, exemplifying flux lines are schematically depicted with dashed lines. As illustrated in FIG. 1c, a room surrounded by a magnetic flux circulation path is utilized for the mechanical safety bearing 107. Therefore, the mechanical safety bearing 107 does not increase the overall axial length of the magnetic suspension system.

In the exemplifying magnetic actuator 100 illustrated in FIGS. 1a-1d, the first section 105 is an annular permanent magnet having an axial direction of magnetization, i.e. the direction of magnetization is parallel with the z-axis of the coordinate system 199. In FIG. 1c, the direction of magnetization is depicted with arrows. The permanent magnet generates a bias magnetic flux that linearizes the operation of the magnetic actuator 100 with respect to changes in electric currents of the coils 103 and in a position of the object 110 being levitated. Furthermore, the biasing improves control dynamics of the magnetic actuator 100 and reduces energy consumption of the magnetic actuator 100. It is however also possible that in a magnetic actuator according to another exemplifying and non-limiting embodiment, a part corresponding to the above-mentioned first section 105 is made of ferromagnetic material, i.e. there is no permanent magnet for generating a bias magnetic flux.

In the exemplifying magnetic actuator 100 illustrated in FIGS. 1a-1d, the mechanical safety bearing 107 comprises a non-ferromagnetic ring 108 and rolling bearing elements 109 for rolling along an annular bearing surface of the non-ferromagnetic ring 108. In this exemplifying case, the rolling bearing elements 109 are balls but the rolling bearing elements 109 could as well be cylindrical or conical rolling elements. It is also possible that the mechanical safety bearing is a sliding bearing. The non-ferromagnetic ring 108 acts as a mechanical support between the second section 106 and the core section 101. Furthermore, the non-ferromagnetic ring 108 acts as a flux barrier. The non-ferromagnetic ring 108 can be made of for example stainless steel.

The exemplifying magnetic actuator 100 illustrated in FIGS. 1a-1d can be assembled separately from other parts of the magnetic suspension system, and thereafter the magnetic actuator 100 can be installed as a single component on the magnetic suspension system. The mechanical safety bearing 107 can be provided with a retainer that supports the rolling bearing elements 109 and keeps them in the vicinity of the non-ferromagnetic ring 108. The retainer is not shown in FIGS. 1a-1d. Depending on the rolling bearing elements, the retainer can be such as a retainer of a known ball bearing or a known roller bearing.

In the exemplifying magnetic actuator 100 illustrated in FIGS. 1a-1d, the core section 101 comprises ferromagnetic sheets that are electrically insulated from each other and stacked in the axial direction of the magnetic actuator 100. The second section 106 can be made of solid ferromagnetic material, or the second section 106 may have a laminated structure comprising a stack of ferromagnetic sheets.

In the exemplifying magnetic suspension system illustrated in FIGS. 1a-1d, the object 110 to be levitated is provided with an annular laminated structure 113 to reduce eddy currents on areas which are facing towards the radially directed teeth 103 of the magnetic actuator 100. The laminated structure 113 is useful in the above-mentioned areas because magnetic flux variations are strongest on these areas of the object 110.

The magnetic suspension system comprises equipment for generating a position signal indicative of the position of the object 110 with respect to a pre-determined reference position of the object 110. The magnetic suspension system comprises a controller 112 for controlling electric currents of the coils 104 of the magnetic actuator 100 based on the position signal. In this exemplifying case, the equipment for generating the position signal comprises inductive sensors 111 where the inductance of each inductive sensor is dependent on the distance from the inductive sensor under consideration to the surface of the object 110. Three of the inductive sensors are illustrated in FIG. 1a. It is also possible that the equipment for generating the position signal comprises means for forming the position signal based on differences between the inductances of the coils 103 of the magnetic actuator 100. The inductance of each coil can be estimated based on e.g. the rate of change of electric current di/dt when the voltage directed to the coil under consideration is changed in a stepwise manner. In this exemplifying case, there is no need for the inductive sensors 111.

Figure 2:
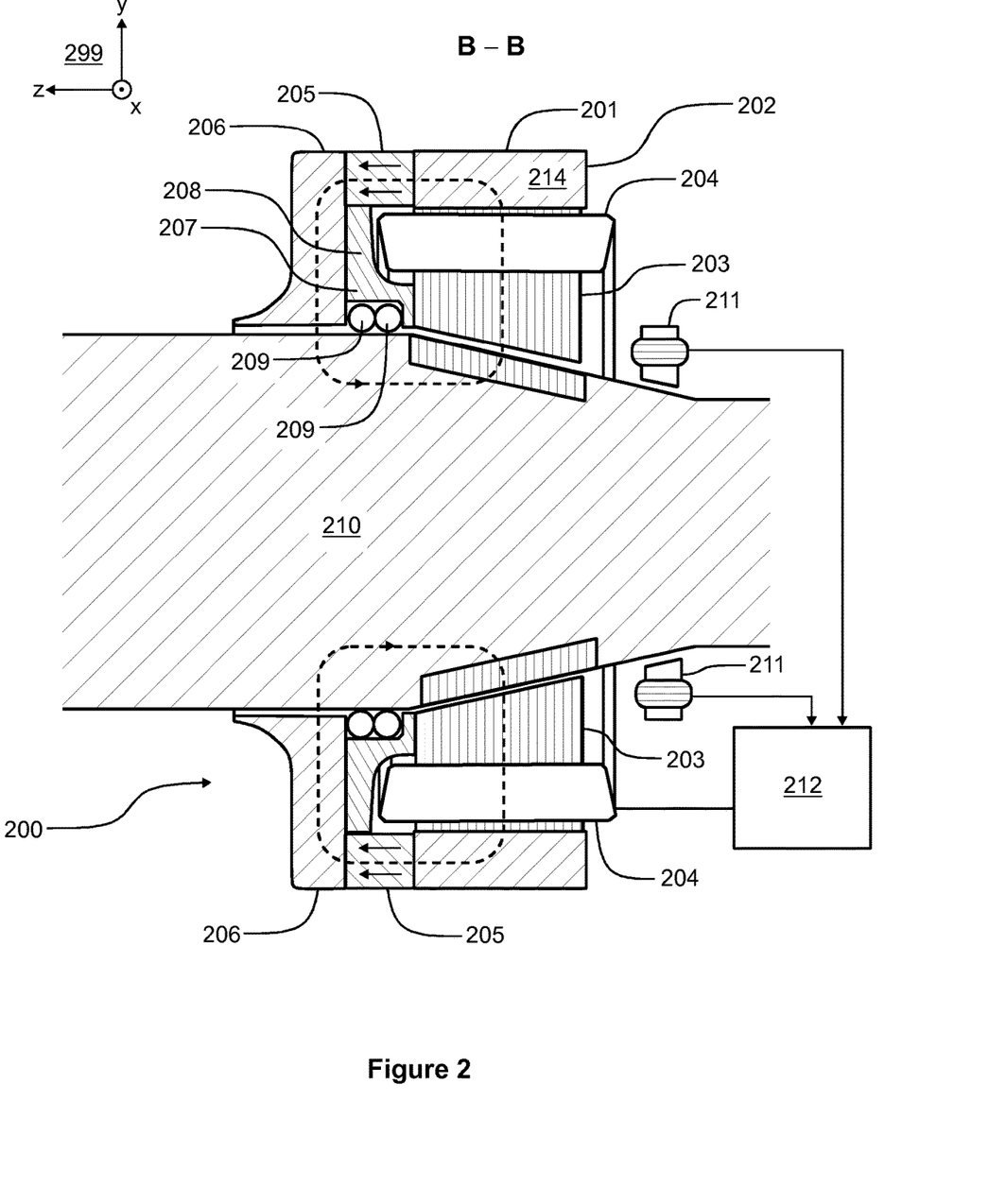
FIG. 2 illustrates a magnetic suspension system that comprises a magnetic actuator according to another exemplifying and non-limiting embodiment.

FIG. 2 shows a section view of a magnetic suspension system that comprises a magnetic actuator 200 according to an exemplifying and non-limiting embodiment. The geometric section plane is parallel with the yz-plane of a coordinate system 299. The magnetic actuator 200, together with possible other magnetic actuators, is configured to levitate an object 210 that can be e.g. a rotor of an electrical machine. The possible other magnetic actuators are not shown in FIG. 2. The exemplifying magnetic suspension system illustrated in FIG. 2 is a conical magnetic bearing for supporting the object 210 in radial directions perpendicular to the z-axis of the coordinate system 299 and also axially in the negative z-direction of the coordinate system 299.

The magnetic actuator 200 comprises a core section 201 having an annular yoke 202 and radially directed teeth 203 joining the annular yoke. FIG. 2 shows two of the radially directed teeth 203. The core section 201 comprises advantageously ferromagnetic material. In the exemplifying magnetic actuator 200 illustrated in FIG. 2, the end-surfaces of the radially directed teeth 203 are congruent with a geometric circular cone surface to provide smooth airgaps with a conical part of the rotationally symmetric object 210. The magnetic actuator 200 comprises coils 204 having radially directed magnetic axes and surrounding the radially directed teeth 203. FIG. 2 shows two of the coils 204. The magnetic actuator 200 comprises a mechanical structure that has a first section 205 and a second section 206. The first section 205 is attached to the annular yoke 202 and extends axially from the annular yoke. The second section 206 is attached to the first section 205 and extends radially from the first section 205 in a same direction in which the radially directed teeth 203 extend radially from the annular yoke 202. In this exemplifying case, the first section 205 is an annular permanent magnet that has an axial direction of magnetization and generates a bias magnetic flux.

The magnetic actuator 200 comprises a mechanical safety bearing 207 that is, in the axial direction of the magnetic actuator, between the second section 206 and the radially directed teeth 203 of the core section 201. Thus, a room surrounded by a magnetic flux circulation path is utilized for the mechanical safety bearing 207. Therefore, the mechanical safety bearing 207 does not increase the overall axial length of the magnetic suspension system. In FIG. 2, exemplifying flux lines are schematically depicted with dashed lines.

In the exemplifying magnetic actuator 200 illustrated in FIG. 2, the mechanical safety bearing 207 comprises a non-ferromagnetic ring 208 and rolling bearing elements 209 for rolling along an annular bearing surface of the non-ferromagnetic ring 208. In this exemplifying case, the rolling bearing elements 209 are balls. The non-ferromagnetic ring 208 acts as a mechanical support between the second section 206 and the core section 201. Furthermore, the non-ferromagnetic ring 208 acts as a flux barrier.

In the exemplifying magnetic actuator 200 illustrated in FIG. 2, the core section 201 comprises ferromagnetic sheets that are electrically insulated from each other and stacked in the axial direction of the magnetic actuator 200. An outer part of the annular yoke 202 of the core section 201 is made of solid ferromagnetic material 214 to avoid a situation in which an axial component of a magnetic flux needs to penetrate electrically insulating material that is between stacked ferromagnetic sheets and that is typically poor magnetic conductor. The second section 206 can be made of solid ferromagnetic material, or the second section 206 may have a laminated structure comprising a stack of ferromagnetic sheets.

The magnetic suspension system comprises equipment for generating a position signal indicative of the position of the object 210 with respect to a pre-determined reference position of the object 210. The magnetic suspension system comprises a controller 212 for controlling electric currents of the coils 204 of the magnetic actuator 200 based on the position signal. In this exemplifying case, the equipment for generating the position signal comprises inductive sensors 211 where the inductance of each inductive sensor is dependent on the distance from the inductive sensor under consideration to the surface of the object 210. Two of the inductive sensors are illustrated in FIG. 2. The position of the object 210 in the x- and y-directions can be estimated on the basis the differences of the inductances of the inductive sensors located on opposite sides of the object 210, and the position of the object 220 in the axial direction, i.e. in the z-direction, can be estimated on the basis of e.g. the average of the inductances of the inductive sensors 211.

The controller 112 shown in FIG. 1a as well as the controller 212 shown in FIG. 2 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the controller 112 as well as the controller 212 may comprise one or more memory devices such as e.g. random-access memory "RAM" devices.

Figure 3:
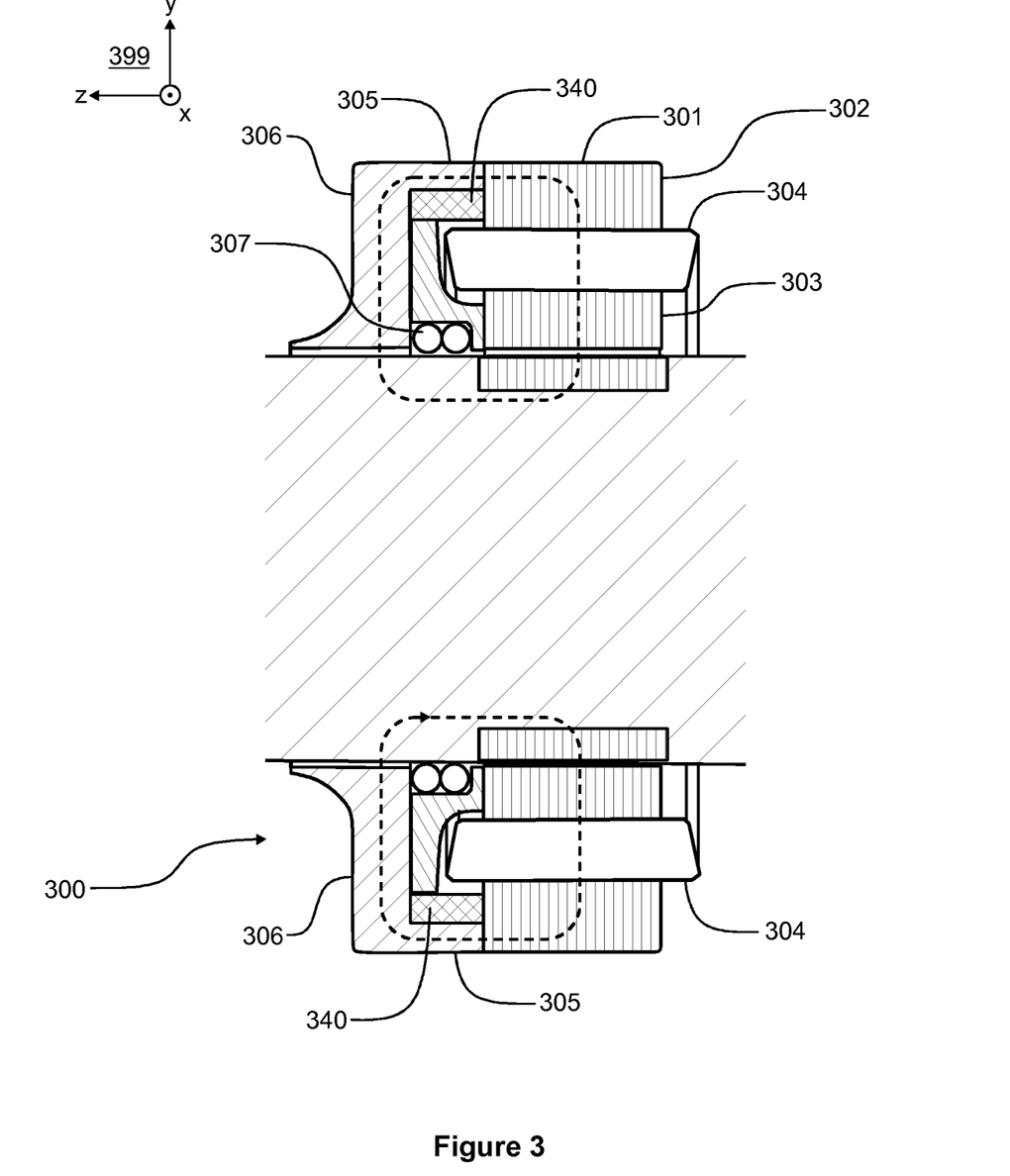
FIG. 3 illustrates a magnetic actuator according to an exemplifying and non-limiting embodiment.

FIG. 3 shows a section view of a magnetic actuator 300 according to an exemplifying and non-limiting embodiment. The geometric section plane is parallel with the yz-plane of a coordinate system 399. The magnetic actuator 300 comprises a core section 301 having an annular yoke 302 and radially directed teeth joining the annular yoke. In FIG. 3, one of the teeth is denoted with a reference 303. The magnetic actuator 300 comprises coils having radially directed magnetic axes and surrounding the radially directed teeth. In FIG. 3, two of the coils are denoted with a reference 304. The magnetic actuator 300 comprises a mechanical structure that has a first section 305 and a second section 306. The first section 305 is attached to the annular yoke 302 and extends axially from the annular yoke. The second section 306 joins the first section 305 and extends radially from the first section 305 in a same direction in which the radially directed teeth 303 extend radially from the annular yoke 302. In this exemplifying case, the first and second sections 305 and 306 are formed by a same piece of material. The magnetic actuator 300 comprises a mechanical safety bearing 307 that is, in the axial direction of the magnetic actuator, between the second section 306 of the mechanical structure and the radially directed teeth of the core section 301. The first section 305 of the mechanical structure is suitable for conducting magnetic flux axially, and the second section 306 is suitable for conducting the magnetic flux radially in a direction opposite to a direction of the magnetic flux in the radially directed teeth 303. The above-mentioned is valid for each flux line. In FIG. 3, exemplifying flux lines are schematically depicted with dashed lines. As illustrated in FIG. 3, a room surrounded by a magnetic flux circulation path is utilized for the mechanical safety bearing 307.

The exemplifying magnetic actuator 300 illustrated in FIG. 3 comprises an annular biasing coil 340 that is, in the axial direction of the magnetic actuator, between the core section 301 and the second section 306 of the mechanical structure. The annular biasing coil 340 has an axially directed magnetic axis.

Figure 4:
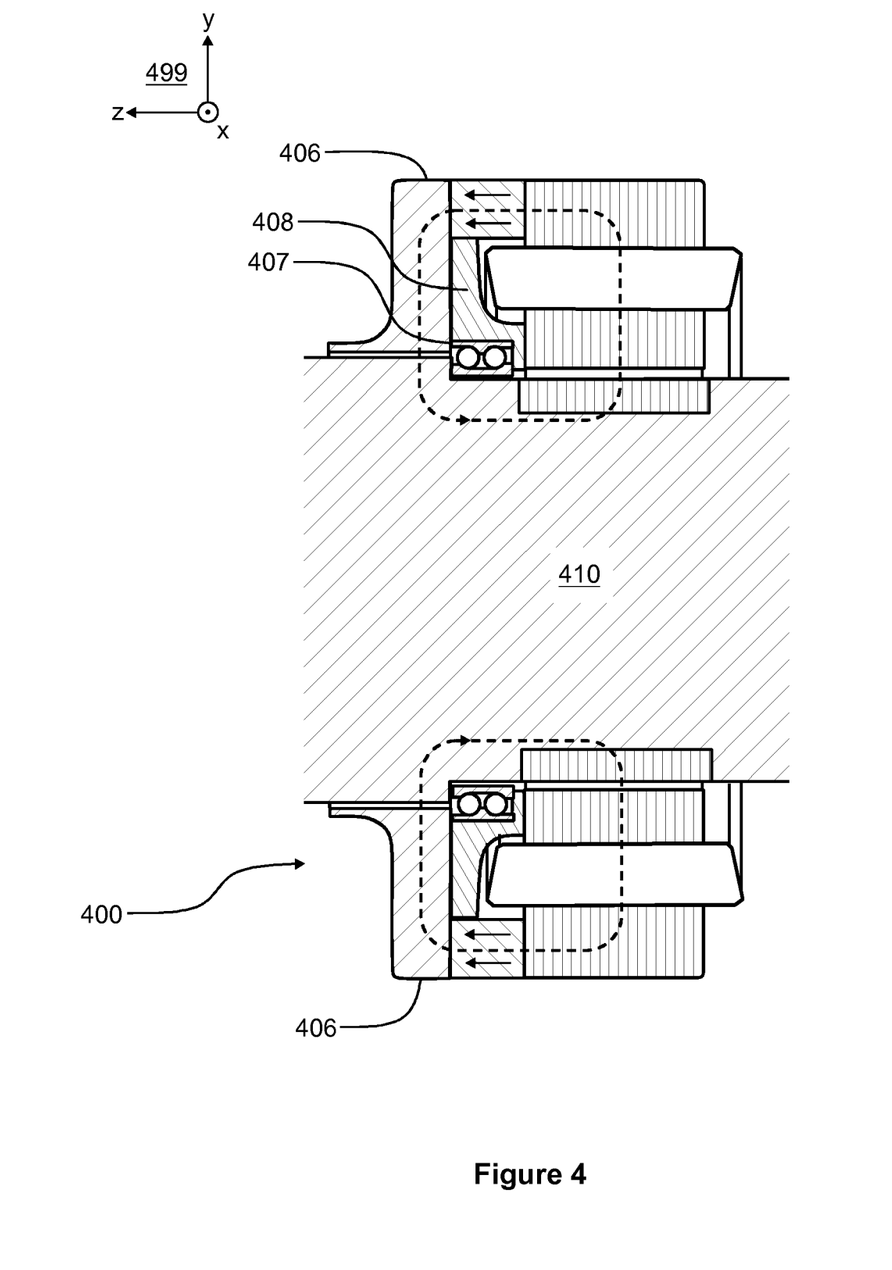
FIG. 4 illustrates a magnetic actuator according to an exemplifying and non-limiting embodiment.

FIG. 4 shows a section view of a magnetic actuator 400 according to an exemplifying and non-limiting embodiment. The geometric section plane is parallel with the yz-plane of a coordinate system 499. The magnetic actuator 400 can be otherwise like the magnetic actuator 100 illustrated in FIGS. 1a-1d but the safety bearing 407 is a rolling bearing that comprises an inner ring and an outer ring so that the outer ring is radially against the non-ferromagnetic ring 408 and the inner surface of the inner ring faces towards the object 410 to be magnetically levitated. In this case, the object 410 is a shaft. In this exemplifying case, the shaft aperture of the section 406 has a diameter greater than the inner diameter of the inner ring of the safety bearing 407. Thus, the shaft can be provided with a shoulder for limiting axial motion of the shaft.

The specific examples provided in the description given above should not be construed as limiting the scope and/or the applicability of the appended claims. Lists and groups of examples provided in the description given above are not exhaustive unless otherwise explicitly stated.

What is claimed is:

1. A magnetic actuator comprising:
   a core section having an annular yoke and radially directed teeth joining the annular yoke,
   coils having radially directed magnetic axes and surrounding the radially directed teeth, and
   a mechanical structure having a first section attached to the annular yoke and extending axially from the annular yoke and a second section joining the first section and extending radially from the first section in a same direction in which the radially directed teeth extend radially from the annular yoke,
   wherein the first section is suitable for conducting magnetic flux axially and the second section is suitable for conducting the magnetic flux radially in a direction opposite to a direction of the magnetic flux in the radially directed teeth, and wherein the magnetic actuator comprises a mechanical safety bearing that is, in an axial direction of the magnetic actuator, between the second section of the mechanical structure and the radially directed teeth of the core section.

2. The magnetic actuator according to claim 1, wherein the first section of the mechanical structure comprises a permanent magnet having an axial direction of magnetization.

3. The magnetic actuator according to claim 1, wherein the magnetic actuator comprises an annular biasing coil that is, in the axial direction of the magnetic actuator, between the core section and the second section of the mechanical structure, the annular biasing coil having an axially directed magnetic axis.

4. The magnetic actuator according to claim 1, wherein the mechanical safety bearing comprises a non-ferromagnetic ring and rolling bearing elements for rolling along an annular bearing surface of the non-ferromagnetic ring.

5. The magnetic actuator according to claim 1, wherein end-surfaces of the radially directed teeth are congruent with a geometric circular cylinder surface.

6. The magnetic actuator according to claim 1, wherein end-surfaces of the radially directed teeth are congruent with a geometric circular cone surface.

7. The magnetic actuator according to claim 1, wherein the core section comprises a stack of ferromagnetic sheets, the ferromagnetic sheets being electrically insulated from each other and constituting the radially directed teeth and the annular yoke.

8. The magnetic actuator according to claim 1, wherein the core section comprises solid ferromagnetic material and a stack of ferromagnetic sheets, the ferromagnetic sheets being electrically insulated from each other and constituting the radially directed teeth and a part of the annular yoke, and the solid ferromagnetic material constituting another part of the annular yoke attached to the first section.

9. The magnetic actuator according to claim 1, wherein the mechanical safety bearing is a rolling bearing that comprises an inner ring, an outer ring, and rolling bearing elements between the inner and outer rings.

10. A magnetic actuator according to claim 9, wherein a shaft aperture of the second section has a diameter greater than an inner diameter of the inner ring of the safety bearing.

11. A magnetic suspension system comprising:
    at least one magnetic actuator for magnetically levitating an object,
    equipment for generating a position signal indicative of a position of the object with respect to a reference position of the object, and a controller for controlling electric currents of the coils of the magnetic actuator based on the position signal, wherein the at least one magnetic actuator comprises:

a core section having an annular yoke and radially directed teeth joining the annular yoke, coils having radially directed magnetic axes and surrounding the radially directed teeth, and a mechanical structure having a first section attached to the annular yoke and extending axially from the annular yoke and a second section joining the first section and extending radially from the first section in a same direction in which the radially directed teeth extend radially from the annular yoke, wherein the first section is suitable for conducting magnetic flux axially and the second section is suitable for conducting the magnetic flux radially in a direction opposite to a direction of the magnetic flux in the radially directed teeth, and wherein the magnetic actuator comprises a mechanical safety bearing that is, in an axial direction of the magnetic actuator, between the second section of the mechanical structure and the radially directed teeth of the core section.

12. The magnetic suspension system according to claim 11, wherein end-surfaces of the radially directed teeth of the core section are congruent with a geometric circular cylinder surface, and the magnetic suspension system is a radial magnetic bearing.

13. The magnetic suspension system according to claim 11, wherein end-surfaces of the radially directed teeth of the core section are congruent with a geometric circular cone surface, and the magnetic suspension system is a conical magnetic bearing.

14. The magnetic suspension system according to claim 11, wherein a shaft aperture of the second section has a diameter greater than an inner diameter of the inner ring of the safety bearing, and the object to be levitated is a shaft having a shoulder abutting axially the inner ring of the safety bearing.

15. The magnetic actuator according to claim 2, wherein the mechanical safety bearing comprises a non-ferromagnetic ring and rolling bearing elements for rolling along an annular bearing surface of the non-ferromagnetic ring.

16. The magnetic actuator according to claim 3, wherein the mechanical safety bearing comprises a non-ferromagnetic ring and rolling bearing elements for rolling along an annular bearing surface of the non-ferromagnetic ring.

17. The magnetic actuator according to claim 2, wherein end-surfaces of the radially directed teeth are congruent with a geometric circular cylinder surface.

18. The magnetic actuator according to claim 3, wherein end-surfaces of the radially directed teeth are congruent with a geometric circular cylinder surface.

19. The magnetic actuator according to claim 4, wherein end-surfaces of the radially directed teeth are congruent with a geometric circular cylinder surface.

20. The magnetic actuator according to claim 2, wherein end-surfaces of the radially directed teeth are congruent with a geometric circular cone surface.

* * * * *